Patented Dec. 24, 1929

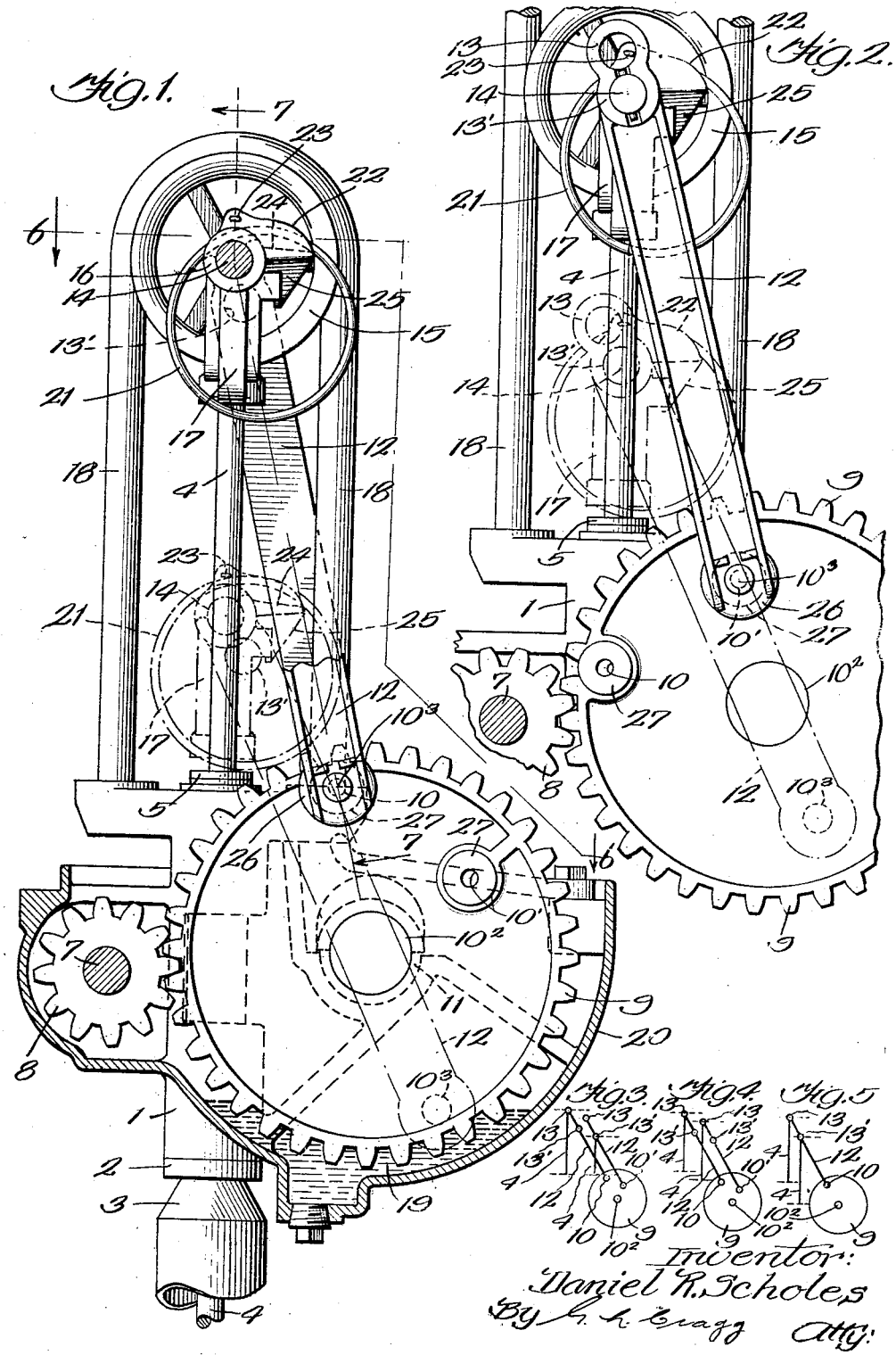

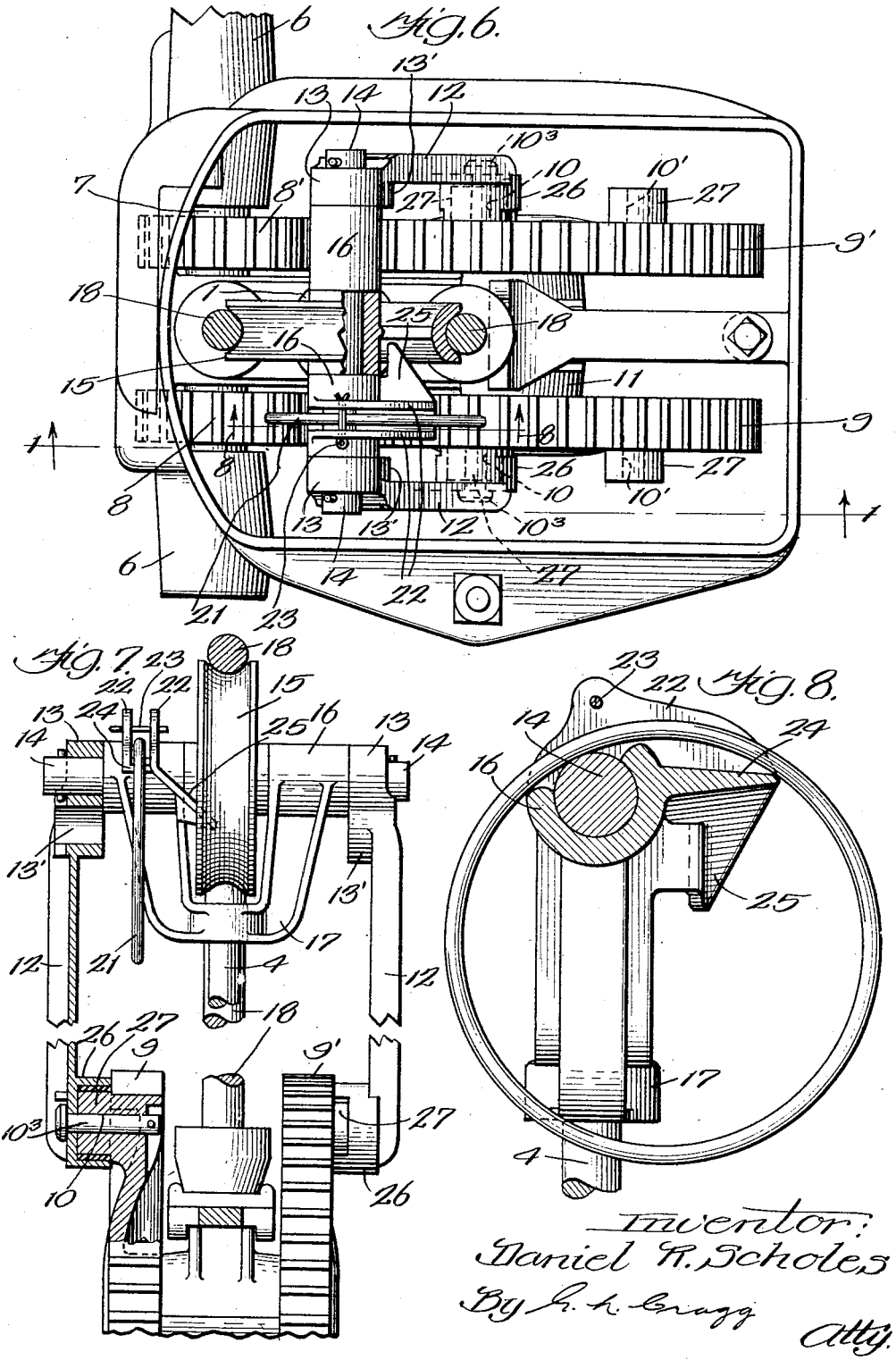

1,740,627

UNITED STATES PATENT OFFICE

DANIEL R. SCHOLES, OF CHICAGO, ILLINOIS, ASSIGNOR TO AEROMOTOR COMPANY, OF CHICAGO, ILLINOIS, A CORPORATION OF ILLINOIS

MOTION-TRANSMITTING MECHANISM

Application filed January 14, 1928. Serial No. 246,781.

My invention relates to mechanism employing reciprocating members, rotating members or cranks, and pitmen coupling the aforesaid members and the invention also relates to lubricating mechanism employing the aforesaid elements and of the general type set forth in my United States Letters Patent 1,341,080, dated May 25, 1920.

In accordance with one feature of my invention, the effective length of the pitman of such a mechanism is changeable and in accordance with another feature of the invention the crank and pitman are provided with means whereby they may be connected at a plurality of places, preferably two, which are spaced unequally from the axis of rotation of the crank.

The lubricating mechanism disclosed in my aforesaid patent comprises the pitman, a gear wheel connected with one pitman end and which constitutes the crank in the combination, a ring loosely carried at the other end of the pitman and bodily moved thereby, said ring being engageable with a portion of said wheel to turn the ring, and means for supplying such wheel portion with lubricant whereby lubricant is transferred to the ring, the place of engagement of the wheel and ring being in a vertical line that is upon one side of the center of gravity of the ring, the end of the pitman remote from the wheel continuing in its movement after the ring engages the wheel whereby gravity also takes part in turning the ring. The ring serves to convey lubricant to bearings at said remote end of the pitman. It may be desirable to change the place of connection of the pitman with the aforesaid gear wheel or crank from the rim of the wheel toward the axis of the wheel to increase the power. The ring would not reach the gear wheel at all if the original pitman connection with the gear wheel were moved closer to the axis of the wheel and the effective length of the pitman were not reduced in accordance with my invention.

The invention also has other advantages and will be more fully explained in connection with the accompanying drawings in which Fig. 1 is a sectional elevation illustrating an embodiment of the invention in a windmill, changed positions being shown by dotted lines; Fig. 2 is a view of a portion of the mechanism shown in Fig. 1 but with parts shown in different positions and with the pitmen differently connected, changed positions being indicated by dotted lines; Figs. 3, 4 and 5 are diagrams illustrating various connections of the pitmen, crank and reciprocating member; Fig. 6 is a sectional view on line 6—6 of Fig. 1; Fig. 7 is a sectional view on line 7—7 of Fig. 1; and Fig. 8 is a sectional elevation of a part of the mechanism.

The mechanism will be first described as illustrated in Figs. 1, 6, 7 and 8. The revolving head 1 of the windmill is mounted to turn upon a collar 2 mounted upon and surrounding a suitably supported stationary upright tubular wind wheel mounting 3 through which is passed the upright reciprocating pump rod or load shaft 4 that is guided in its reciprocations by guiding boxes of which one 5 is shown upon the windwheel mounting. The upper part of the mounting 3 passes through a vertical bore in the mill head, the engaging surfaces of this bore and the mounting passing therethrough being cylindrical to be in turning fit.

The mill head is formed with horizontal bearings 6 for the horizontal wind wheel shaft 7 which carries the wind wheel (not shown) of the mill. Two upright coaxial spur pinions 8, 8' of the same diameter are fixedly secured upon the shaft 7 and mesh with the coaxial upright spur gears 9, 9' of the same diameter fixed upon a common horizontal shaft $10^2$ supported in bearings 11 that are carried upon the mill head.

Pitmen 12 are connected at their lower ends with the spur gears 9, 9' to be driven thereby, these pitmen terminating at their upper ends in bearings 13 through which a shaft 14 passes. The lower ends of the pitmen are connected with the wheels 9, 9' by pins $10^3$ inserted in holes 10 in the wheels 9, 9'. An idler sheave 15 is provided upon the middle of the shaft 14 and is maintained spaced apart from the bearings 13 by the non-rotating spacing sleeves 16 through which the shaft 14 passes. The sleeves 16 are united by a yoke 17 for maintaining them in rigid relation and to which the upper end of the pump rod or load shaft is secured in order that it may be reciprocated by the pitmen.

The sheave has a transversely curved annular groove in its periphery that receives the vertical sides of the guiding stirrup 18, whereby the upper ends of the pitmen are constrained to move in a vertical rectilineal path to impart similar movement to the pump rod or load shaft 4.

The purpose specifically served by the structure of the prior patent is the application of lubricating oil to the shaft 14 and parts turning upon and with respect thereto and also the application of lubricating oil to the periphery of the sheave 15 and the parts of the upright guides 18 engaged thereby. Means for initiating the transfer of lubricant resides in the rotating spur gear or element 9, before mentioned and itself serving as a lubricant source, which together with gear 9' dips within a body of oil 19 contained in the oil basin 20 formed in the mill head. The teeth of the gear wheels carry the oil upwardly, oil being transferred from gear 9 to an oil conveyer 21 traveling bodily with the shaft 14 and in fluid conductive connection with this shaft and associated parts. This fluid conveyer 21 is in the form of a ring which surrounds the shaft 14 and one of the bearings 16 for this shaft, this ring being sufficiently large in diameter to reach and be actuated by the gear wheel 9 while said shaft is in the lower part of its travel. The ring is influenced to turn counterclockwise intermittently by the tangential torque imparted thereto by the clockwise rotating gear 9 when contacting therewith. The center of gravity of the ring, which happens also to be its geometrical center, is also upon one side of the place of contact of the ring with the gear 9 when arresting the ring in its downward movement so that counterclockwise turning effort is also then imparted to the ring by its own weight.

By the construction and arrangement described, the ring is caused to creep and, in creeping, will carry the oil above and deposit it upon the shaft 14 along which the oil will work to lubricate parts turning upon the shaft.

In order that the oil may more readily be passed to the shaft the particular sleeve 16 surrounded by the ring is cut away to expose an upper part of the shaft so that the ring may engage the shaft or drop oil directly thereupon. This particular sleeve 16 is also provided with parallel wings 22 between which the ring is disposed substantially to confine it to one plane. A cotter pin 23 is passed through these wings and above the shaft to prevent the ring from leaving the space between the wings. A shelf or ledge 24 is disposed between the wings. The ring is supported by shaft 14 and shelf 24 when it is not lifted by gear 9.

An oil leader 25 is formed in the same piece with shelf 24 from which this leader depends. Some of the oil transferred from the ring to the shelf will flow downwardly onto said leader which ends within the circle of the sheave 15. The oil will drop onto the inner surface of the rim of the sheave and will work its way to the annular groove in the sheave rim and thence to the upright guides 18 received in this annular groove.

As thus far specifically described, the pitmen connections at holes 10 with the coaxial crank gear wheels 9, 9' are at the greater distance from the common axis of these wheels, Fig. 3. The connections at bearing sleeves 13 on said pitmen with the reciprocating member 4 give the pitmen their greater effective length. If the pitmen connections at holes 10 with the gear wheels 9, 9' are transferred to the holes 10' that are nearer said wheel axis by transferring the pins $10^3$ to the latter holes, the power is increased, but if the connections at 13 are not altered, that is, if the effective length of the pitmen is not reduced, the oil ring 21 will not reach the crank gear wheel 9. By shifting shaft 14 from bearing sleeves 13 on the pitmen to bearing sleeves 13' on the pitmen, the effective length of the pitmen will be sufficiently reduced to enable said ring to reach said crank wheels (Figs. 2 and 3).

Figs. 4 and 5 diagrammatically illustrate other adjustments, some of which may be employed when the operativeness of the oil ring is not to be considered. In these two figures the range in which the reciprocating members move is shifted but not reduced. In Fig. 3, the ranges are unequal but their lower limits are common. The lower ends of the pitmen are formed with sockets 26 which receive the bearing bosses 27 that are formed upon the gear wheels 9, 9' coaxially with the holes 10, 10' that pass through said bosses. The inner faces of the bottoms of said sockets are in contact with the outer ends of the corresponding bosses and respectively nearer said bosses and the wheels carrying the bosses than the adjacent portions of the pitmen that are upon the exteriors of the sockets, that is, said bosses are not as long as the distances between the bodies of the pitmen and the faces of wheels 9, 9' respectively next the pitmen, whereby the outer faces of the bosses are between the wheels and the adjacent portions of the pitmen at the exteriors of the sockets enabling the pitmen, in operation, to clear the bosses at which they are not connected with the wheels.

Changes may be made without departing from the invention.

Having thus described my invention, I claim:

1. Lubricating mechanism including a member in the form of a wheel; a pitman, said wheel and pitman having means for connecting one end of the pitman at two places spaced unequally from the axis of rotation of the wheel; a reciprocable member connected with the other end of the pitman; a ring carried at the other end of the pitman and bodily moved thereby, said ring being engageable with a portion of said wheel to turn the ring; and means for supplying such wheel portion with lubricant whereby lubricant is transferred to the ring, the pitman having facility for adjusting its effective length to maintain the ring engageable with the wheel when the place of connection of the pitman and wheel is altered.

2. Lubricating mechanism including a member in the form of a wheel; a pitman, said wheel and pitman having means for connecting one end of the pitman at two places spaced unequally from the axis of rotation of the wheel; a reciprocable member connected with the other end of the pitman; a ring loosely carried at the other end of the pitman and bodily moved thereby, said ring being engageable with a portion of said wheel to turn the ring; and means for supplying such wheel portion with lubricant whereby lubricant is transferred to the ring, the place of engagement of the wheel and ring being in a vertical line that is upon one side of the center of gravity of the ring, the end of the pitman remote from the wheel continuing in its movement after the ring engages the wheel whereby gravity also takes part in turning the ring, the pitman having facility for adjusting its effective length to maintain the ring engageable with the wheel when the place of connection of the pitman and wheel is altered.

3. Lubricating mechanism including a member in the form of a wheel; a pitman, said wheel and pitman having means for connecting one end of the pitman at two places spaced unequally from the axis of rotation of the wheel; a reciprocable member connected with the other end of the pitman; a ring loosely carried at the other end of the pitman and bodily moved thereby, said ring being engageable with a portion of the wheel; and means for supplying such wheel portion with lubricant whereby lubricant is transferred to the ring, the place of engagement of the wheel and ring being in a vertical line that is upon one side of the center of gravity of the ring, the end of the pitman remote from the wheel continuing in its movement after the ring engages the wheel whereby gravity is effective in turning the ring, the pitman having facility for adjusting its effective length to maintain the ring engageable with the wheel when the place of connection of the pitman and wheel is altered.

4. Lubricating mechanism including a member in the form of a wheel; a pitman, said wheel and pitman having means for connecting one end of the pitman at two places spaced unequally from the axis of rotation of the wheel; a reciprocable member connected with the other end of the pitman; a ring loosely carried at the other end of the pitman and bodily moved thereby, said ring being engageable with a portion of said wheel to turn the ring; and means for supplying such wheel portion with lubricant whereby lubricant is transferred to the ring, the pitman having facility for adjusting its effective length to maintain the ring engageable with the wheel when the place of connection of the pitman and wheel is altered.

5. Lubricating mechanism including a member in the form of a wheel; a pitman, said wheel and pitman having means for connecting one end of the pitman at two places spaced unequally from the axis of rotation of the wheel; a reciprocable member connected with the other end of the pitman; a ring carried at the other end of the pitman and bodily moved thereby, said ring being engageable with a portion of said wheel to turn the ring; and means for supplying such wheel portion with lubricant whereby lubricant is transferred to the ring, one end of the pitman having two portions, spaced along the pitman, for alternative connection with one of said members, to maintain the ring engageable with the wheel when the place of connection of the pitman and wheel is altered.

6. Lubricating mechanism including a member in the form of a wheel; a pitman, said wheel and pitman having means for connecting one end of the pitman at two places spaced unequally from the axis of rotation of the wheel; a reciprocable member connected with the other end of the pitman; a ring loosely carried at the other end of the pitman and bodily moved thereby, said ring being engageable with a portion of said wheel to turn the ring; and means for supplying such wheel portion with lubricant whereby lubricant is transferred to the ring, the place of engagement of the wheel and ring being in a vertical line that is upon one side of the center of gravity of the ring, the end of the pitman remote from the wheel continuing in its movement after the ring engages the wheel whereby gravity also takes part in turning the ring, one end of the pitman having two portions, spaced along the pitman, for alternative connection with one of said members, to maintain the ring engageable with the wheel when the place of connection of the pitman and wheel is altered.

7. Lubricating mechanism including a member in the form of a wheel; a pitman, said wheel and pitman having means for connecting one end of the pitman at two places spaced unequally from the axis of rotation of the wheel; a reciprocable member connected with the other end of the pitman; a ring loosely carried at the other end of the pitman and bodily moved thereby, said ring being engageable with a portion of the wheel; and means for supplying such wheel portion with lubricant whereby lubricant is transferred to the ring, the place of engagement of the wheel and ring being in a vertical line that is upon one side of the center of gravity of the ring, the end of the pitman remote from the wheel continuing in its movement after the ring engages the wheel whereby gravity is effective in turning the ring, one end of the pitman having two portions, spaced along the pitman, for alternative connection with one of said members, to maintain the ring engageable with the wheel when the place of connection of the pitman and wheel is altered.

8. Lubricating mechanism including a member in the form of a wheel; a pitman, said wheel and pitman having means for connecting one end of the pitman at two places spaced unequally from the axis of rotation of the wheel; a reciprocable member connected with the other end of the pitman; a ring loosely carried at the other end of the pitman and bodily moved thereby, said ring being engageable with a portion of said wheel to turn the ring; and means for supplying such wheel portion with lubricant whereby lubricant is transferred to the ring, one end of the pitman having two portions, spaced along the pitman, for alternative connection with one of said members, to maintain the ring engageable with the wheel when the place of connection of the pitman and wheel is altered.

In witness whereof, I hereunto subscribe my name.

DANIEL R. SCHOLES.